US011677151B2

(12) United States Patent
Kerselaers et al.

(10) Patent No.: US 11,677,151 B2
(45) Date of Patent: Jun. 13, 2023

(54) NEAR-FIELD COMMUNICATIONS DEVICE

(71) Applicant: NXP B.V., Eindhoven (NL)

(72) Inventors: Anthony Kerselaers, Herselt (BE); Liesbeth Gommé, Anderlecht (BE)

(73) Assignee: NXP B.V., Eindhoven (NL)

( * ) Notice: Subject to any disclaimer, the term of this patent is extended or adjusted under 35 U.S.C. 154(b) by 126 days.

(21) Appl. No.: 17/017,731

(22) Filed: Sep. 11, 2020

(65) Prior Publication Data

US 2022/0085504 A1 Mar. 17, 2022

(51) Int. Cl.
*H01Q 7/00* (2006.01)
*H01Q 7/08* (2006.01)
*H04B 5/00* (2006.01)

(52) U.S. Cl.
CPC .............. *H01Q 7/005* (2013.01); *H01Q 7/08* (2013.01); *H04B 5/0031* (2013.01); *H04B 5/0037* (2013.01)

(58) Field of Classification Search
CPC .......... H01Q 7/005; H01Q 7/08; H01Q 1/273; H01Q 7/00; H01Q 1/38; H01Q 1/3275; H01Q 1/36; H01Q 1/243; H01Q 1/50; H01Q 9/285; H01Q 13/10; H01Q 5/35; H01Q 5/371; H01Q 21/30; H01Q 1/48; H01Q 21/0006; H01Q 9/30; H01Q 13/106; H01Q 21/28; H01Q 9/42; H01Q 1/44; H01Q 1/22; H01Q 7/06; H01Q 9/40; H01Q 5/40; H01Q 9/32; H01Q 21/29; H01Q 25/00; H01Q 9/16; H01Q 1/24; H01Q 1/241; H01Q 5/357; H01Q 1/525; H01Q 9/20; H01Q 1/2208; H01Q 5/20; H01Q 9/38; H01Q 1/2291; H01Q 21/00; H01Q 1/362; H01Q 1/52; H01Q 1/526; H01Q 13/16; H01Q 5/30; H01Q 5/307; H01Q 5/364; H01Q 9/24; H01Q 1/32; H01Q 13/085; H01Q 5/321; H01Q 9/265; H01Q 1/245; H01Q 3/24; H01Q 5/328; H01Q 9/0407; H01Q 9/26; H01Q 9/28; H01Q 1/523; H01Q 23/00; H01Q 1/2283;

(Continued)

(56) References Cited

U.S. PATENT DOCUMENTS 8,613,395 B2 * 12/2013 Kimura .................... H01Q 1/38
235/492
8,797,148 B2 * 8/2014 Kato ..................... H01Q 1/2208
340/572.1

(Continued)

FOREIGN PATENT DOCUMENTS

EP 3 367 503 A1 8/2018
EP 3 389 135 A1 10/2018

OTHER PUBLICATIONS

U.S. Appl. No. 16/872,995; 34 pages (May 12, 2020).

*Primary Examiner* — Ab Salam Alkassim, Jr.

(57) ABSTRACT

One example discloses a near-field device, including: a near-field magnetic antenna, including a coil, configured to receive or transmit near-field magnetic signals; a near-field electric antenna configured to receive or transmit near-field electric signals; and a set of electrical components, electrically coupled to the near-field magnetic antenna and the near-field electric antenna; wherein at least one of: the coil of the near-field magnetic antenna, or a conductive surface of the near-field electric antenna, forms a boundary around the set of electrical components.

16 Claims, 6 Drawing Sheets

(58) Field of Classification Search
CPC ...... H01Q 1/242; H01Q 1/325; H01Q 13/103; H01Q 9/0442; H01Q 9/06; H01Q 1/27; H01Q 1/46; H01Q 13/08; H01Q 5/335; H01Q 9/00; H01Q 1/1214; H01Q 21/064; H01Q 3/34; H01Q 5/50; H01Q 9/04; H01Q 9/0421; H01Q 9/045; H01Q 15/0053; H01Q 3/2605; H01Q 3/38; H04B 5/0031; H04B 5/0037
See application file for complete search history.

(56) References Cited

U.S. PATENT DOCUMENTS

| | | | |
|---|---|---|---|
| 9,024,725 B2* | 5/2015 | Ikemoto | H01Q 1/2216 455/41.1 |
| 9,559,405 B2* | 1/2017 | Sorrell | H01Q 1/22 |
| 9,819,075 B2* | 11/2017 | Kerselaers | H04B 5/0081 |
| 9,819,097 B2* | 11/2017 | Kerselaers | H04B 5/0087 |
| 9,941,937 B1* | 4/2018 | Kerselaers | H01Q 7/08 |
| 10,320,086 B2* | 6/2019 | Kerselaers | H01Q 1/2208 |
| 10,347,973 B2* | 7/2019 | Kerselaers | H01Q 1/273 |
| 10,566,690 B1* | 2/2020 | Kerselaers | H01Q 1/50 |
| 10,644,757 B1* | 5/2020 | Kerselaers | H04B 1/126 |
| 10,763,921 B1* | 9/2020 | Kerselaers | H04B 5/0012 |
| 10,812,126 B1* | 10/2020 | Kerselaers | H04B 5/02 |
| 10,812,149 B1* | 10/2020 | Kerselaers | A63F 13/24 |
| 10,812,199 B1* | 10/2020 | Kerselaers | H04B 5/02 |
| 10,826,627 B1* | 11/2020 | Kerselaers | H04B 5/0012 |
| 10,862,542 B1* | 12/2020 | Kerselaers | H04B 5/0031 |
| 10,917,773 B1* | 2/2021 | Kerselaers | H04B 5/0056 |
| 10,944,447 B1* | 3/2021 | Kerselaers | H04B 17/336 |
| 11,031,680 B2* | 6/2021 | Kerselaers | H04B 5/0075 |
| 11,038,556 B1* | 6/2021 | Kerselaers | H04B 5/0081 |
| 11,108,436 B1* | 8/2021 | Kerselaers | H04B 5/0081 |
| 11,108,437 B1* | 8/2021 | Kerselaers | H04B 5/0012 |
| 2005/0134520 A1* | 6/2005 | Rawat | A61N 1/37229 343/873 |
| 2010/0277387 A1* | 11/2010 | Schantz | H01Q 21/24 343/788 |
| 2011/0136430 A1* | 6/2011 | Konya | H01Q 9/32 455/41.1 |
| 2014/0062827 A1* | 3/2014 | Kato | H01Q 1/2225 343/856 |
| 2015/0318624 A1* | 11/2015 | Schantz | H01Q 1/273 343/867 |
| 2016/0149313 A1* | 5/2016 | Gommé | H01Q 7/005 343/725 |
| 2017/0062949 A1* | 3/2017 | Kerselaers | H01Q 21/0006 |
| 2017/0195009 A1* | 7/2017 | Nagai | H04B 5/0081 |
| 2017/0324170 A1* | 11/2017 | Kerselaers | H01Q 1/273 |
| 2018/0219273 A1* | 8/2018 | Kerselaers | H01Q 7/08 |
| 2018/0241116 A1* | 8/2018 | Kerselaers | H04B 5/0031 |
| 2019/0162766 A1* | 5/2019 | Kerselaers | G01R 29/0814 |
| 2019/0266468 A1* | 8/2019 | Kato | H01Q 1/273 |
| 2019/0296439 A1* | 9/2019 | Kerselaers | H01Q 1/273 |
| 2019/0363459 A1* | 11/2019 | Geens | H01Q 25/00 |
| 2020/0083962 A1* | 3/2020 | Gommé | H04B 5/0068 |
| 2020/0106170 A1* | 4/2020 | Kerselaers | H01Q 7/06 |
| 2020/0244315 A1* | 7/2020 | Kerselaers | H04B 5/005 |
| 2020/0328505 A1* | 10/2020 | Kerselaers | H04B 5/02 |
| 2021/0013594 A1* | 1/2021 | Kerselaers | H01Q 1/241 |
| 2021/0055134 A1* | 2/2021 | Gommé | G01D 5/2066 |
| 2021/0234563 A1* | 7/2021 | Gommé | H04B 5/0025 |
| 2021/0239648 A1* | 8/2021 | Huang | G01N 27/4145 |
| 2021/0242908 A1* | 8/2021 | Gommé | H04B 5/0012 |
| 2021/0250065 A1* | 8/2021 | Kerselaers | H04B 5/0093 |
| 2021/0359722 A1* | 11/2021 | Kerselaers | H04B 5/0081 |
| 2022/0095239 A1* | 3/2022 | Kerselaers | H04W 52/242 |
| 2022/0149897 A1* | 5/2022 | Gommé | H04B 5/0056 |
| 2022/0302960 A1* | 9/2022 | Gommé | H04B 5/0031 |
| 2022/0302962 A1* | 9/2022 | Verschueren | A63F 13/21 |

* cited by examiner

NEAR-FIELD COMMUNICATIONS DEVICE

The present specification relates to systems, methods, apparatuses, devices, articles of manufacture and instructions for a near-field device.

SUMMARY

According to an example embodiment, a near-field device, comprising: a near-field magnetic antenna, including a coil, configured to receive or transmit near-field magnetic signals; a near-field electric antenna configured to receive or transmit near-field electric signals; and a set of electrical components, electrically coupled to the near-field magnetic antenna and the near-field electric antenna; wherein at least one of: the coil of the near-field magnetic antenna, or a conductive surface of the near-field electric antenna, forms a boundary around the set of electrical components.

In another example embodiment, both the coil of the near-field magnetic antenna, and the conductive surface of the near-field electric antenna form the boundary around the set of electrical components.

In another example embodiment, only the coil of the near-field magnetic antenna forms the boundary around the set of electrical components.

In another example embodiment, only the conductive surface of the near-field electric antenna forms the boundary around the set of electrical components.

In another example embodiment, the near-field device is encapsulated with a flexible material.

In another example embodiment, the flexible material is a dielectric material.

In another example embodiment, the flexible material hermetically seals the electrical components from an external environment.

In another example embodiment, the conductive surface of the near-field electric antenna is a first conductive surface; and further comprising a second conductive surface included in the near-field electric antenna; and wherein the first conductive surface is attached to a top layer of the flexible material and the second conductive surface is attached to a bottom layer of the flexible material.

In another example embodiment, the electrical components form a plane along a Z-axis of the device; the conductive surface of the near-field electric antenna is a first conductive surface; and further comprising a second conductive surface included in the near-field electric antenna; and wherein the first conductive surface and the second conductive surface are separated at a distance along the Z-axis based on a near-field electric signal received and/or transmitted by the near-field electric antenna.

In another example embodiment, the distance is a greatest distance along the Z-axis.

In another example embodiment, the electrical components form a plane along a Z-axis of the device; the conductive surface of the near-field electric antenna is a first conductive surface; and further comprising a second conductive surface included in the near-field electric antenna; wherein the first conductive surface forms a plane slightly higher than the electrical components along the Z-axis; and wherein the second conductive surface forms a plane slightly lower than the electrical components along the Z-axis.

In another example embodiment, the electrical components form a plane along a Z-axis of the device; the conductive surface of the near-field electric antenna is a first conductive surface; and further comprising a second conductive surface included in the near-field electric antenna; wherein the first conductive surface, the second conductive surface, and the electrical components are formed in a same plane along the Z-axis.

In another example embodiment, the near-field device is encapsulated with a flexible material; and the flexible material is configured to be pierced by another device to create a via.

In another example embodiment, the flexible material is configured to be pierced by a hypodermic needle.

In another example embodiment, further comprising a via; wherein the via is within the boundary.

In another example embodiment, the via is centered within the boundary.

In another example embodiment, the electrical components are physically supported by a rigid substrate and the near-field magnetic and electric antennas are physically supported only by the flexible material.

In another example embodiment, the electrical components include a near-field antenna tuning circuit and a transceiver.

In another example embodiment, either the coil of the near-field magnetic antenna, or the conductive surface of the near-field electric antenna has a planar topology; and the planar topology includes: a circle, a rectangle, a polygon, an oval, or a diamond.

In another example embodiment, further comprising a voltage boost coil electrically coupled to the near-field electric antenna and configured to boost a voltage from the electrical components sent to the near-field electric antenna in a transmit mode; and wherein the voltage boost coil is electrically coupled to both the near-field electric antenna and the near-field magnetic antenna at a near-field antenna signal feeding connection.

In another example embodiment, the voltage boost coil is included in the boundary around the set of electrical components.

In another example embodiment, the device is embedded in at least one of: a patch, a glucose sensor, a wearable device; a smart watch; a smartwatch housing, a wireless mobile device, an earbud, a hearing aid, a headphone, an activity tracker, or a heart rate monitor.

In another example embodiment, the boundary is a continuous boundary.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings.

Figure 1:
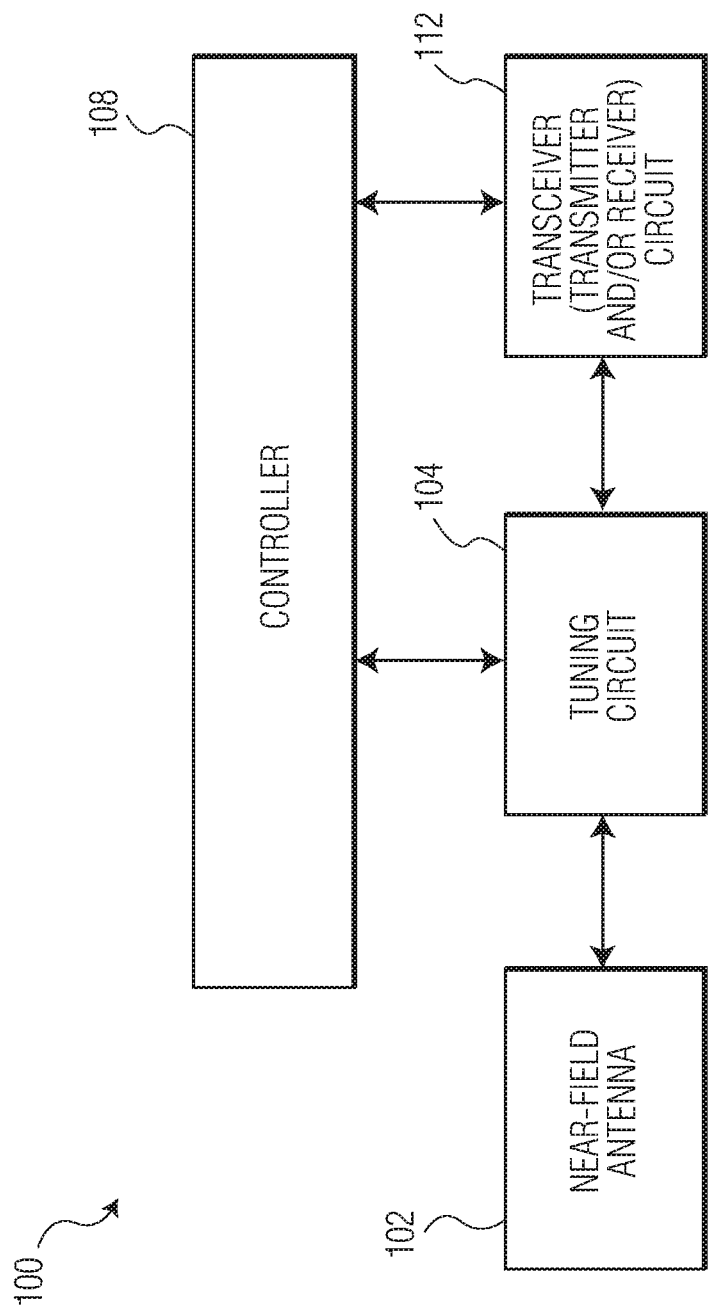
FIG. 1 is an example of a near-field wireless system.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

Herein discussed are near-field interactions between one or more near-field devices on a user's body or the body of a conductive surface (i.e. on-body devices), and other conductive surfaces and/or other wireless devices (i.e. off-body devices) based on either near-field electromagnetic induction (NFEMI), where the transmitter and receiver are coupled by both magnetic (H) and electric (E) fields, near-field electric-induction (NFEI), where the transmitter and receiver are coupled by electric (E) fields, and near-field magnetic-induction (NFMI/NFC), where the transmitter and receiver are coupled by magnetic (H) fields. While RF wireless communication is accomplished by propagating an RF plane wave through free space, NFEMI, NFEI, NFMI and NFC communicates using non-propagating quasi-static E and/or H field signals.

In various example embodiments, a first near-field antenna includes a near-field electric-induction antenna (e.g. such as either a NFEI or NFEMI antenna) and is configured for on-body communications. A second near-field antenna includes a near-field magnetic-induction antenna (e.g. such as an NFC antenna) and is configured for off-body communications.

For example, an on-body sensor in the first near-field wireless device can be configured to communicate the sensor's readings to a second on-body near-field wireless device that collects the sensor's readings and perhaps other user information as well. A third off-body wireless device could be a smartphone/NFC reader that energizes the second on-body near-field wireless device that collected the sensor's readings, and thereby prompts the second on-body near-field wireless device to transmit the collected the sensor's readings to the smartphone/NFC reader.

Note, while example embodiments discussed herein refer to a user's body, on-body and off-body, in alternate embodiments the near-field device 100, body is herein broadly defined to include at least: a human's body, an animal's body, a body of a living organism, a body structure of an inanimate object, a robot, a vehicle, a docking system, a physical coupling system, a station on an assembly line, and so on.

An H-field antenna (i.e. magnetic antenna) is primarily sensitive to magnetic fields and/or primarily initiates magnetic fields when driven by a current. Any E-field component from an H-field antenna is strongly reduced (e.g. −20 to −60 dB reduction, a factor of 0.1 to 0.0008 (10% to 0.08%) depending on the antenna design).

A small loop antenna is an example H-field antenna and includes a loop antenna with dimensions much smaller than the wavelength of its use. The small loop antenna does not resonate at the NFEMI carrier frequency but is instead tuned to resonance by an external reactance. In some example embodiments the current in the small loop antenna has in every position of the loop the same value.

An E-field antenna (i.e. electric antenna) is primarily sensitive to electric fields and/or primarily initiates electric fields when driven by a voltage. Any H-field component from an E-field antenna is strongly reduced (e.g. −20 to −60 dB reduction, a factor of 0.1 to 0.0008 (10% to 0.08%) depending on the antenna design).

A short loaded dipole antenna is an example E-field antenna and includes a short dipole with dimensions much smaller than the NFEMI carrier frequency and in some example embodiments has extra capacitance surfaces at both ends.

The quasi-static characteristic of these fields is a result of the NFEMI antenna dimensions in combination with their carrier frequencies. Most of the near-field energy is stored in the form of magnetic and electric fields, while a small amount of RF energy inevitably propagates in free space. Small antenna geometries minimize radiating waves in free space.

In some applications, various portions of the near-field device may be enclosed in or electrically blocked by a conductive housing that may reduce normal near-field communications since the conductive housing forms a Faraday Cage.

FIG. 1 is an example of a near-field wireless system 100. The example near-field wireless system 100 includes a near-field antenna 102, a tuning circuit 104, a controller 108 and a transceiver circuit 112.

The controller 108 is configured to monitor and maintain the system's 100 operational resonance frequency and operational bandwidth/quality factor of the near-field signals (e.g. NFEI or NFEMI) carried by the near-field antenna. The controller 108 is configured to adjust the tuning parameters if either the operational resonance frequency is different from a preselected resonance frequency and/or the operational bandwidth is different from a preselected bandwidth.

The tuning circuit 104 is configured to adjust the system's 100 resonance frequency using a capacitive bank (C-bank), and bandwidth using a resistive bank (R-bank) in response to signals from the controller 108. The C-bank and R-bank discretes are in some examples about 130 pF and 5000 ohms respectively to support the required resonance frequency (e.g. 10.6 MHz) and bandwidth (e.g. 400 KHz). The controller 108 is configured to adjust (e.g. increment/decrement) the C-bank and R-bank values using the tuning circuit 104.

In some example embodiments, the transceiver circuit 112 is configured to inject test signals (e.g. three test signals) into the tuning circuit 104 and the antenna 102. The controller 108 is then configured to: first, monitor a loading of the near-field antenna 102, and adjust the tuning parameters if the loading is different from a preselected loading.

Figure 2A:
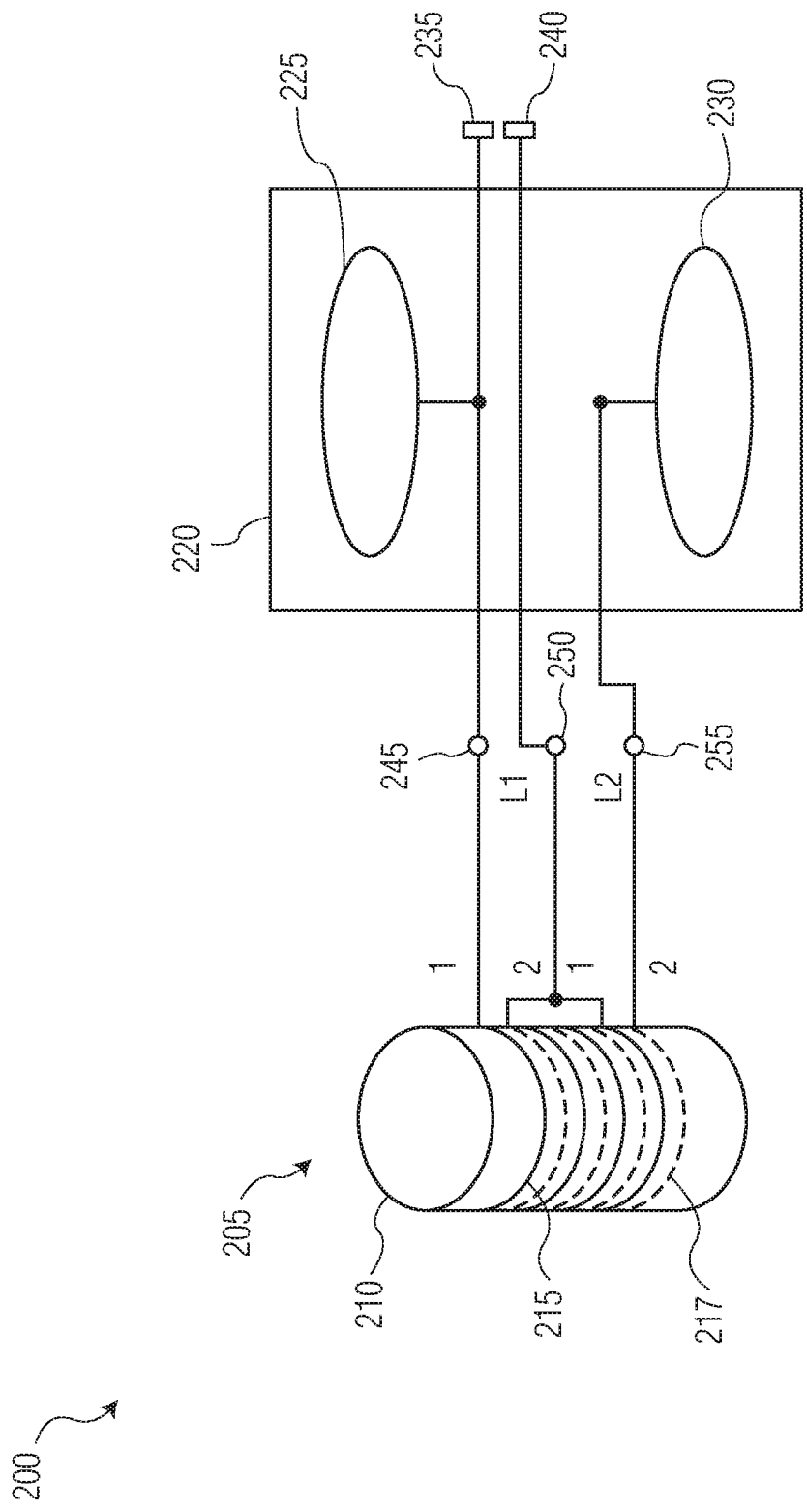
FIG. 2A is an example near-field antenna architecture.

FIG. 2A is a first example near-field antenna architecture 200. The antenna 200 includes a short loaded dipole portion 220 with two conductive loading plates 225, 230 and a small loop antenna 205.

The small loop antenna includes at least two coupled coils 215 and 217. The first coil 215 has an inductance of L1, and the second coil 217 has an inductance of L2. Both coils 215 and 217 may be connected, at connection point 250, such that they form a larger inductance compared with the inductance of the first coil 215 and the second coil 217.

Both coils 215 and 217 may be air coils, wrapped around a ferrite core 210 (as shown in FIG. 2A), or they can be in the form of a planar structure.

In the ferrite core 210 version, the coils 215 and 217 may be wrapped around the core 210 in an interleaved fashion, or wrapped on top of one another, i.e., the second coil 217 is first wrapped around the core 210, and then the first coil 215 is then wrapped around the core 210 on top of the second coil 217.

Connection point 245 couples one end of the first coil 215 to a first feeding connection 235 and to the first plate of the small loaded dipole 225. Connection point 250 couples another end of the first coil 215 to one end of the second coil 217 and to a second feeding connection 240. Connection point 255 couples another end of the second coil 217 to the second plate 230 of the small loaded dipole 220.

Figure 2B:
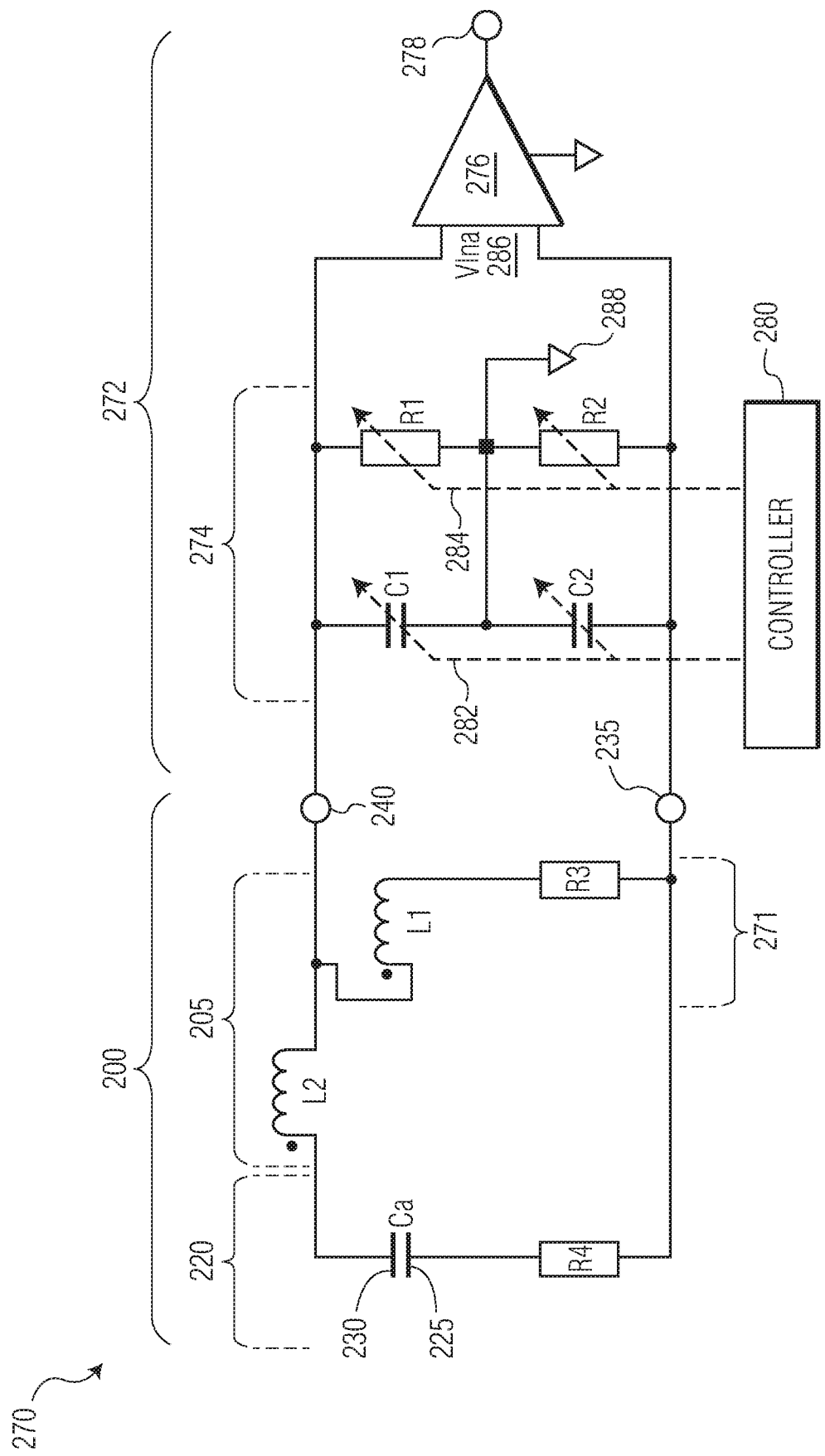
FIG. 2B is an example near-field device circuit including the near-field antenna, supporting circuits, and configured to receive non-propagating quasi-static near-field signals.

FIG. 2B is an example near-field circuit 270 based on the example near-field antenna architecture 200, supporting circuits 272, and configured to receive non-propagating quasi-static near-field signals. The near-field circuit 270 is configured to receive (e.g. in a receive mode) a non-propagating quasi-static near-field signal. Note that the near-field antenna 200 may also be coupled to a transmitter circuit (not shown) for two-way communications.

Coil 215 in the near-field antenna 200, having inductance (L1) and resistance (R3), forms a magnetic (H-field) antenna 271. The two loading plates 225 and 230 in the dipole portion 220 forms an electric (E-field) antenna 220. The two loading plates 225 and 230 are conductive structures. Coil 217 having inductance (L2) increases/boosts the electric antenna's 220 transmit voltage received from a transmitter power amplifier (not shown) coupled to the feeding connections 235, 240.

The supporting circuits 272 include a tuning circuit 274, an LNA 276 (low noise amplifier), a communications signal interface 278, and a controller 280. The supporting circuits 272 in other example embodiments include the transmitter power amplifier (not shown).

The tuning circuit 274 is coupled to the first and second feed points 235, 240. The tuning circuit 274 includes a first variable tuning capacitance bank (C1), a second variable tuning capacitance bank (C2), a first variable tuning resistance bank (R1), and a second variable tuning resistance bank (R2). The capacitance banks and resistance banks are coupled to a reference potential 288 (e.g. a ground potential). The capacitive banks are coupled to the controller 280 by control line 282, and the resistance banks are coupled to the controller 280 by control line 284.

The controller 280 adjusts the first and second capacitance banks (C1), (C2) to adjust a resonant frequency of the magnetic 271 and the electric 220 antennas (e.g. to 10.6 MHz). The controller 280 adjusts the first and second resistance banks (R1), (R2) to adjust a bandwidth of the magnetic 271 and the electric 220 antennas (e.g. to 400 KHz) sufficient to allow the non-propagating quasi-static near-field signal to be received from the antennas 271, 220.

The capacitance banks (C1), (C2) are equally tuned using the control line 282 from the controller 280, and the resistance banks (R1), (R2) are equally tuned using the control line 284 from the controller 280.

The LNA 276 is coupled between the tuning circuit 274 and the communications signal interface 278. When the near-field circuit 270 is receiving the non-propagating quasi-static near-field signal, induced voltage 286 (Vlna) is present across the LNA 276 differential inputs. The LNA 276 amplifies the received near-field signal which is then further processed by additional radio/RFIC/baseband circuits (not shown) coupled to the communications signal interface 278. The LNA 276 is also coupled to the reference potential 288.

Since both inputs to the LNA 276 are coupled to the antennas 271, 220 the near-field circuit's 270 configuration is said to be balanced. The balanced circuit configuration helps reject interference signals that enter both LNA 276 input lines with the same amplitude and phase. In other examples an unbalanced circuit can be used.

During operation a voltage is induced in the electric (E-field) antenna 220 by a received near-field electric signal. This voltage generates a current through the E-field antenna 220.

Now discussed is a wearable sensor device having a topology that can be variously implemented to minimize an overall device height and/or volume, while maximizing near-field signal strength. Such implementations/designs minimize an obstruction to a user and/or body-surface that bulkier near-field devices would suffer from.

In some implementations a first device (i.e. wearable glucose sensor) is attached to a human user suitable for measuring body parameters and communicating them to a second device across the user by means of Near field electric and magnetic induction (NFEMI). A second device (e.g. an insulin pump) influences the user's medical state.

Figure 3A:
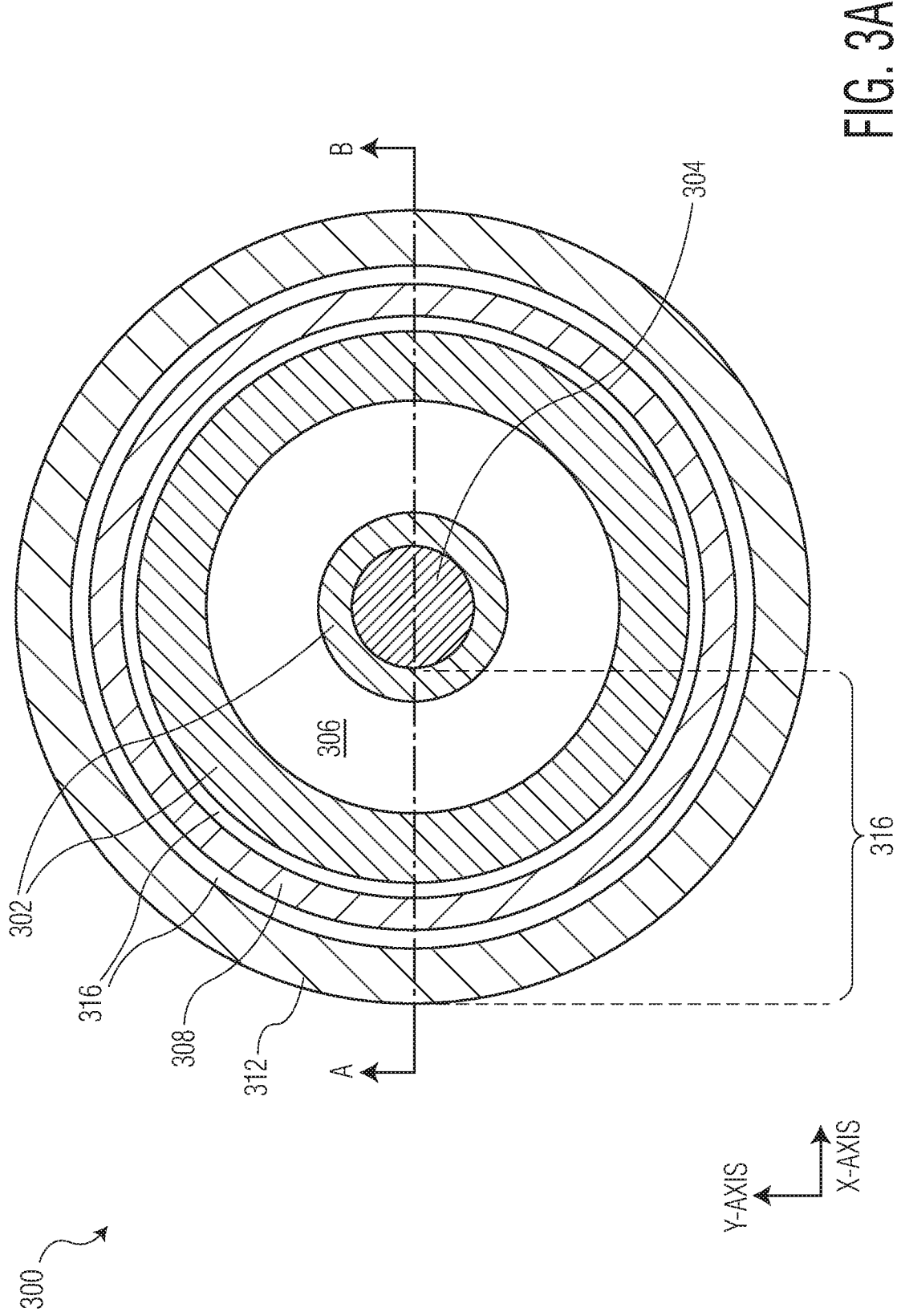
FIG. 3A is an example top-view of a near-field wireless device hardware implementation.

FIG. 3A is an example top-view of a near-field wireless device 300 hardware implementation. The device 300 includes a substrate 302, an optional via 304, electrical components 306, a magnetic (H-field) antenna coil 308, a voltage boost coil 310, an electric (E-field) antenna formed by a first conductive surface 312 and a second conductive surface 314, and a flexible material 316 (e.g. dielectric material).

While the device 300 is shown as circular, the device 300 can be of any shape depending upon its application.

The substrate 302 in some example embodiments is rigid and positioned close to a bottom side of the sensor and is set for mounting the electronic and mechanical components required for the functionality of the device 300. The substrate 302 can be for example the printed circuit board with a FR4 material, for example with a thickness of 1 mm and a dielectric constant of 4.4.

The via 304 (e.g. passage, hole, conduit, etc.) in some example embodiments is in an approximate middle of the device 300, but in other example embodiments can be offset. The via 304 can be used for enabling mechanical devices to pass-through the device 300, for perhaps measuring user/body-surface parameters (e.g. glucose) and administering materials (e.g. insulin) as needed depending upon the device's 300 application.

The electrical components 306 are on top of the substrate 302 and in some example embodiments include near-field NFEMI radio circuits. The electrical components 306 include a communication unit and the other required electronic and mechanical components. In some example embodiments, the tuning circuit 274 and the supporting circuits 272 (e.g. transmitter, receiver, or transceiver communication circuits).

The magnetic (H-field) antenna coil 308 is attached at a first location on a top layer of the flexible material 316. A topology (i.e. geometry) of the coil 308 is at least one of: helical, a planar spiral, or a three-dimensional spiral.

The voltage boost coil 310 is attached to a second side of the top layer of the flexible material 316 and has the function to boost the voltage in transmit mode that is used for the electric antenna. The voltage boost coil 310, while shown underneath the magnetic (H-field) antenna coil 308, can in other embodiments be interleaved with the magnetic (H-field) antenna coil 308 in a same plane, or in a different location depending upon a production design of the device 300. By placing the first and second conductive surfaces 312, 314 centered about the same plane as the electrical components 306 along the Z-axis could enable a flatter, more compact device 300 along the Z-axis.

The electric (E-field) antenna is formed by the first conductive surface 312 and the second conductive surface

314. The first conductive surface 312 is in some example embodiments attached to or very near the top layer of the flexible material 316 and the second conductive surface 314 is attached to or very near the bottom layer of the flexible material 316 at a maximum distance apart such that the near-field electric signal is maximized.

Both conductive surfaces 312, 314 form a capacitor and in a receive mode induce a voltage into the supporting circuits 272, and in a transmit mode receive a voltage from the supporting circuits 272 to be converted to a near-field electric signal by the conductive surfaces 312, 314. The second conductive surface 314 is positioned closer to the body compared with the first conductive surface 312.

In some example embodiments, to minimize an overall height of the device 300, one or more of the near-field antenna components 308, 310, 312, 314 are physically configured to wrap around the substrate 302, via 304 and the electrical components 306.

In other example embodiments, the one or more of the near-field antenna components 308, 310, 312, 314 are physically configured to form a boundary around (e.g. wrap around, spiral around, encircle, fence, demarcate, etc.) the substrate 302, via 304 and the electrical components 306 so as to maximize an overall near-field signal strength of the device 300 for a giving total device 300 volume. In this way all non-antenna components would be inside the near-field antenna structure. In some example embodiments, the boundary is substantially or completely continuous (e.g. such as a solid conductive plate); however in other example embodiments the boundary may have gaps (e.g. such as the gaps between individual windings of a spiral coil, or a gap between two halves of a single conductive plate).

In some example embodiments, one or more of the near-field antenna components 308, 310, 312, 314 still forms a continuous loop, but only wraps around a portion of the substrate 302 and/or electrical components 306.

The flexible material 316 (e.g. dielectric) may be formed from one or multiple layers and encapsulates the device 300. If there are multiple layers then the layers are attached to each other so that electrical connections can be arranged to combine both the electric and magnetic antennas and the tuning circuitry and the communication unit in the electrical components 306.

The flexible material 316 in some example embodiments is a gel-like dielectric material than not only can hermetically seal/encapsulate all or various portions of the device 300, but also to better conform to a user/body-surface wearing the device 300.

In some example embodiments the flexible material 316 is surrounded by a plastic shell/casing. The flexible material 316 and plastic shell/casing individually or together enable the device 300 to be water/liquid proof even in example embodiments where the flexible material 316 is pierced to create the via/hole 304.

The flexible material 316 can be pierced by a medical needle (e.g. to administer insulin) or a hose/tube to create the via 304, of if a via 304 already exists the medical needle or the hose/tube can be placed through the via 304. In other example embodiments, there is and/or is no need for the via 304 and the near-field antennas and electrical components 306 are completely embedded within the flexible material 316.

The via 304 (e.g. passage, hole, conduit, etc.) in some example embodiments is in an approximate middle of the device 300, but in other example embodiments can be offset. The via 304 can be used for enabling mechanical devices to pass-through the device 300, for perhaps measuring user/body-surface parameters (e.g. glucose) and administering materials (e.g. insulin) as needed depending upon the device's 300 application.

Figure 3B:
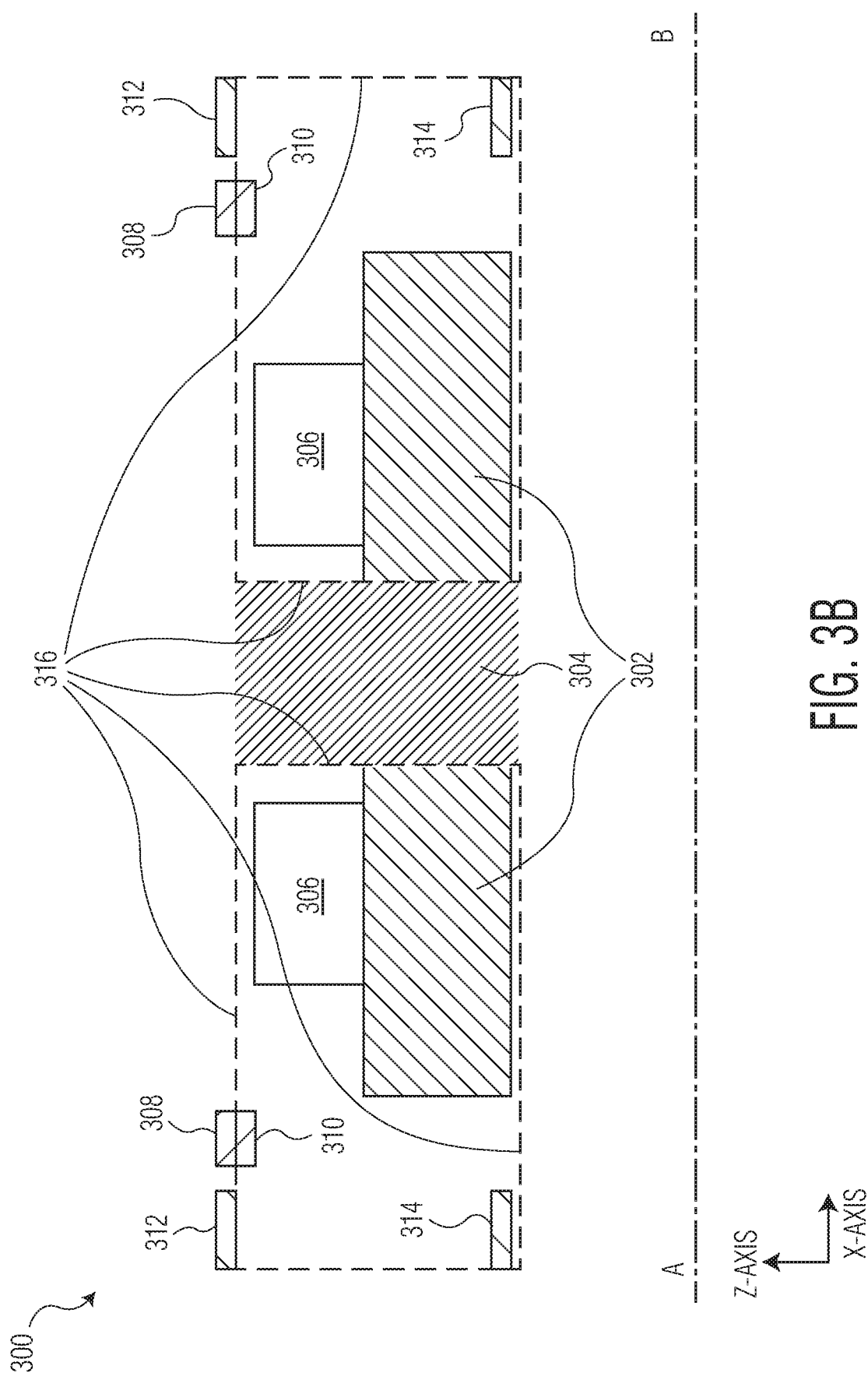
FIG. 3B is an example side-view of the near-field wireless device of FIG. 3A.

FIG. 3B is an example side-view of the near-field wireless device 300 of FIG. 3A. In the side-view, placement of the second conductive surface 314 in a plane slightly below a plane of the electrical components 306 along the Z-axis can be seen. Placement of the first conductive surface 312 in a plane slightly above the plane of the electrical components 306 along the Z-axis can also be seen.

In some example embodiments the first conductive surface 312 and the second conductive surface 314 are separated at a greatest distance along the Z-axis to better maximize the near-field electric (E-field) signal.

While the first conductive surface 312 is shown in a plane slightly higher than the electrical components 306 along the Z-axis, and the second conductive surface 314 is shown in a plane slightly lower than the electrical components 306 along the Z-axis, in other example embodiments either or both of the first and second conductive surfaces 312, 314 are centered about a same plane as the electrical components 306 along the Z-axis.

By placing the first and second conductive surfaces 312, 314 centered about the same plane as the electrical components 306 along the Z-axis could enable a flatter, more compact device 300 along the Z-axis.

Figure 3C:
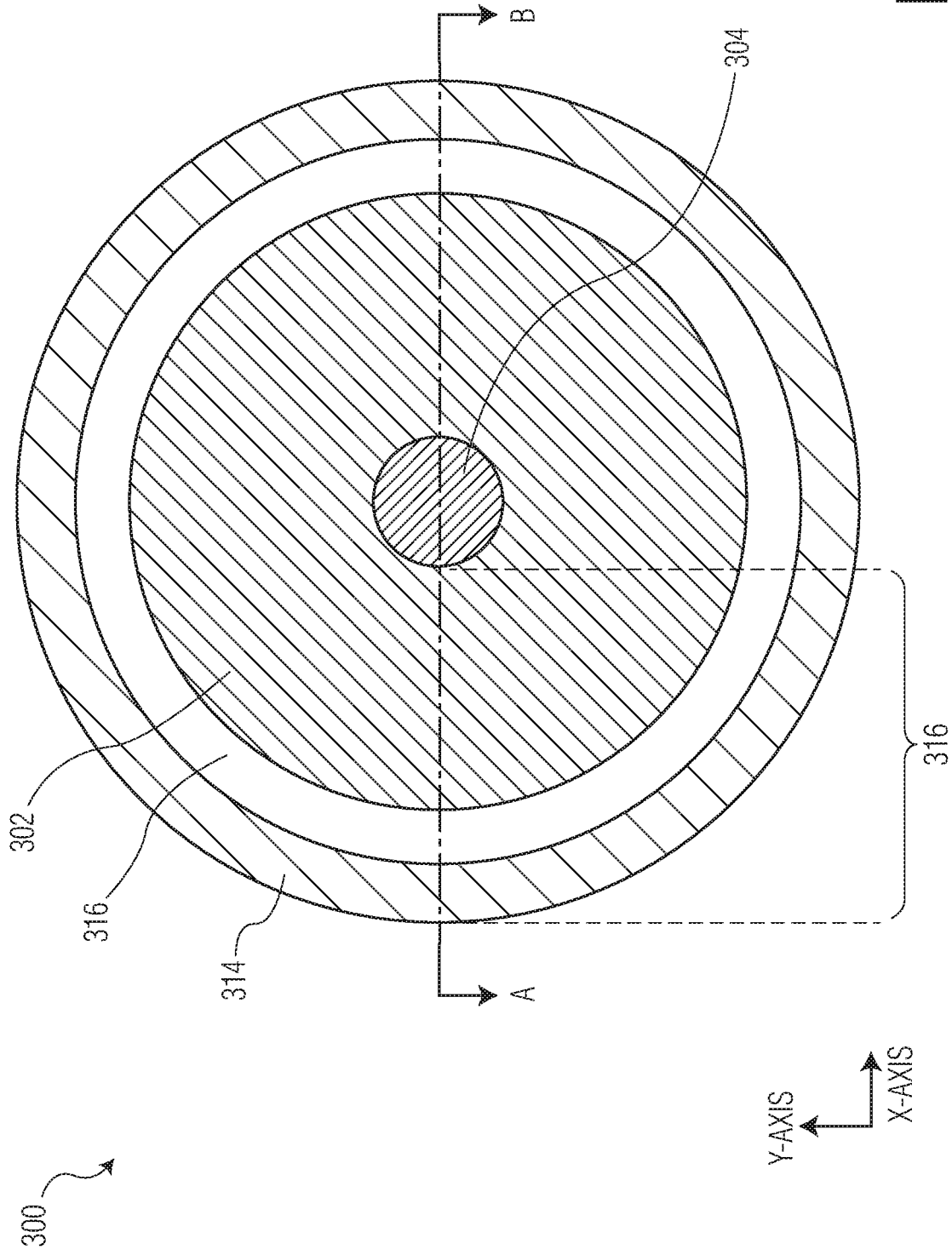
FIG. 3C is an example bottom-view of a near-field wireless device of FIG. 3A.

FIG. 3C is an example bottom-view of a near-field wireless device 300 of FIG. 3A. The flexible material 316 on the bottom side of the device 300 is in some example embodiments is very thin (e.g. 1 mm) to enable better capacitive coupling to a user/body wearing the near-field device 300. The flexible material 316 material can be a thin sheet of FR4 with a dielectric constant of 4.4 and a thickness of 0.2 mm. Other materials can also be used as long as they have a dielectric property.

Applications of the device 300 include: wearables for wireless on-body networks that require a small/low-height form factor; medical applications, for example glucose monitoring system that is worn on-body, where the glucose sensor measures the glucose level in the blood at some position on the body and transfers this information using NFEMI to an insulin pump also worn on-body or in close proximity to the user's body, and perhaps further including NFC circuits as a backup to save such medical information when the device's 300 battery is discharged.

Various instructions and/or operational steps discussed in the above Figures can be executed in any order, unless a specific order is explicitly stated. Also, those skilled in the art will recognize that while some example sets of instructions/steps have been discussed, the material in this specification can be combined in a variety of ways to yield other examples as well, and are to be understood within a context provided by this detailed description.

In some example embodiments these instructions/steps are implemented as functional and software instructions. In other embodiments, the instructions can be implemented either using logic gates, application specific chips, firmware, as well as other hardware forms.

When the instructions are embodied as a set of executable instructions in a non-transitory computer-readable or computer-usable media which are effected on a computer or machine programmed with and controlled by said executable instructions. Said instructions are loaded for execution on a processor (such as one or more CPUs). Said processor includes microprocessors, microcontrollers, processor modules or subsystems (including one or more microprocessors or microcontrollers), or other control or computing devices.

A processor can refer to a single component or to plural components. Said computer-readable or computer-usable storage medium or media is (are) considered to be part of an article (or article of manufacture). An article or article of manufacture can refer to any manufactured single component or multiple components. The non-transitory machine or computer-usable media or mediums as defined herein excludes signals, but such media or mediums may be capable of receiving and processing information from signals and/or other transitory mediums.

It will be readily understood that the components of the embodiments as generally described herein and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

What is claimed is:

1. A physical structure for a near-field device, comprising:
   a near-field magnetic antenna, including a coil, configured to receive or transmit near-field magnetic signals;
   a near-field electric antenna, including a conductive surface, configured to receive or transmit near-field electric signals; and
   a set of electrical components, including a tuning circuit, electrically coupled to the coil in the near-field magnetic antenna and to the conductive surface in the near-field electric antenna;
   wherein at least one of: the coil of the near-field magnetic antenna, or the conductive surface of the near-field electric antenna, completely encircle the set of electrical components;
   wherein the electrical components form a plane along a Z-axis of the device;
   wherein the conductive surface of the near-field electric antenna is a first conductive surface;
   further comprising a second conductive surface included in the near-field electric antenna;
   wherein the first conductive surface forms a plane higher than the electrical components along the Z-axis; and
   wherein the second conductive surface forms a plane lower than the electrical components along the Z-axis;
   further comprising a via;
   wherein the via is completely encircled by the antennas;
   wherein the electrical components are physically supported by a rigid substrate and the near-field magnetic and electric antennas are physically coupled to a flexible material;
   further comprising a voltage boost coil electrically coupled to the near-field electric antenna and configured to boost a voltage from the electrical components sent to the near-field electric antenna in a transmit mode; and
   wherein the voltage boost coil is electrically coupled to both the near-field electric antenna and the near-field magnetic antenna at a near-field antenna signal feeding connection.

2. The structure of claim 1:
   wherein the set of electrical components are fully encapsulated with the flexible material.

3. The structure of claim 2:
   wherein the flexible material is a dielectric material.

4. The structure of claim 2:
   wherein the flexible material hermetically seals the electrical components from an external environment.

5. The structure of claim 2:
   wherein the first conductive surface is attached to an outer top layer of the flexible material and the second conductive surface is attached to an outer bottom layer of the flexible material.

6. The structure of claim 1:
   wherein the first conductive surface and the second conductive surface are separated by a non-zero distance along the Z-axis.

7. The structure of claim 6:
   wherein the distance is a greatest possible distance along the Z-axis limited only by outer surfaces of the physical structure of the near-field device.

8. The structure of claim 1:
   wherein the near-field device is encapsulated with the flexible material; and
   wherein the flexible material is configured to be pierced by another device to create a via.

9. The structure of claim 8:
   wherein the flexible material is configured to be pierced by a hypodermic needle.

10. The structure of claim 1:
    wherein the via is centered within the antennas.

11. The structure of claim 1:
    wherein the electrical components further include a transceiver.

12. The structure of claim 1:
wherein either the coil of the near-field magnetic antenna, or the conductive surface of the near-field electric antenna has a planar topology; and
wherein the planar topology includes: a circle, a rectangle, a polygon, an oval, or a diamond.

13. The structure of claim 1:
wherein the voltage boost coil also completely encircles the set of electrical components.

14. The structure of claim 1:
wherein the device is embedded in at least one of: a patch, a glucose sensor, a wearable device; a smart watch; a smartwatch housing, a wireless mobile device, an earbud, a hearing aid, a headphone, an activity tracker, or a heart rate monitor.

15. The structure of claim 1:
wherein at least one of the antennas completely encircle the set of electrical components without any gaps.

16. The structure of claim 1:
wherein the device is embedded in a human medical sensor wearable patch.

* * * * *